United States Patent [19]

Prosdocimi

[11] 3,901,632
[45] Aug. 26, 1975

[54] VULCANIZING MOULD FOR PNEUMATIC TYRES AND THE LIKE

[75] Inventor: Tito Prosdocimi, Rovereto, Italy

[73] Assignee: Meccanica Marangoni S.p.A., Roverto-Trento, Italy

[22] Filed: Oct. 23, 1973

[21] Appl. No.: 408,326

[30] Foreign Application Priority Data
Nov. 7, 1972 Germany............................ 2254334

[52] U.S. Cl............................... 425/47; 425/DIG. 5
[51] Int. Cl.²............................................. B29H 5/02
[58] Field of Search................... 425/46, 47, DIG. 5

[56] References Cited
UNITED STATES PATENTS

| 2,948,031 | 8/1960 | Webb............................ 425/DIG. 5 |
| 3,082,480 | 3/1963 | Balle................................... 425/46 |
| 3,682,576 | 8/1972 | Gross.................................. 425/46 |
| 3,703,346 | 11/1972 | Deboeur............................. 425/46 |
| 3,778,203 | 12/1973 | MacMillan...................... 425/47 X |
| 3,787,155 | 1/1974 | Zangl................................. 425/47 |
| 3,797,979 | 3/1974 | Greenwood....................... 425/47 |

FOREIGN PATENTS OR APPLICATIONS

| 1,579,190 | 7/1970 | Germany |
| 975,644 | 11/1964 | United Kingdom................ 425/46 |
| 2,000,796 | 7/1971 | Germany............................ 425/46 |
| 1,919,884 | 3/1971 | Germany............................ 425/46 |
| 1,917,081 | 10/1970 | Germany............................ 425/47 |

Primary Examiner—J. Howard Flint, Jr.
Attorney, Agent, or Firm—Ostrolenk, Faber, Gerb & Soffen

[57] ABSTRACT

A vulcanizing mould for pneumatic tyres comprising a plate and a counter-plate mounted on the two mould carriers of a press, the facing surfaces of the two plates being provided with profiled discs which mould the profiles of the two side walls of a tyre carcass. A ring is fixedly connected to the plate and has an annular inner surface of truncated cone shape. A plurality of radially adjustable sectors have outer surfaces cooperating with the truncated cone-shaped surface of the ring, the inner surfaces of the sectors being provided with profiling for the moulding of the tread portion of the tyre carcass. Guide elements are provided for the axial guiding of the sectors on the plate and the ring, and the guide elements are provided with abutments for limiting the spacing of the sectors from one another. Radial guide elements are provided on the surfaces of the sectors and the counter-plate facing each other for effecting the simultaneous radial displacement of the sectors along the plane of the counter-plate when the plate is moved towards the counter-plate.

6 Claims, 5 Drawing Figures

VULCANIZING MOULD FOR PNEUMATIC TYRES AND THE LIKE

The invention relates to a mould for vulcanizing the tyre carcasses of pneumatic tyres and the like.

Moulds are known for pressing and vulcanizing tyre carcasses for pneumatic tyres, which consist of a plurality of radially movable sectors, the concave inner walls of which mould the tread and the shoulder of the tyre carcass.

The known vulcanizing moulds have various disadvantages however, inter alia, that of axial stress of the material from which the tyre is made in addition to the radial stress during the pressing operation which produces the tread portion of the tyre. This axial stressing of the material causes either tearing or deformation of the tread portion.

A further disadvantage of known moulds is the difficulty of localizing on the desired area of the tyre carcass the heat effect which is required for the vulcanizing process, this area in practice being not only on the tread portion of the tyre carcass, but also on the shoulders thereof.

A further known disadvantage of known moulds is the difficulty of always achieving a complete and uneconomical separation of the vulcanized tyre carcass from the various sectors of the mould when the latter is opened; this disadvantage being more prevalent in automatic manufacturing processes.

These and other disadvantages are overcome by using a mould according to the invention, which is of simple construction, with its operation ensuring that the radial sectors are displaced in the radial direction without any axial displacement of the material in the mould during pressing and vulcanizing.

A further object of the invention is to provide a mould which ensures the separation and removal of the moulded tyre carcasses from the mould sectors as soon as these have been spaced from one another. With this mould it is possible to provide at any time a space adjacent the lower plane of the press, whereby the loading and unloading of the mould is considerably accelerated and facilitated; from this results the possibility of using the mould or press according to the invention in apparatus for the continuous and automatic manufacture of tyre carcasses.

A further purpose of the invention is to provide a mould which permits practical and economic exchange of the press sectors in order to achieve manufacture of tyre carcasses of different sizes without the necessity of having to have to hand a number of moulds for the various tyre carcass sizes which may have to be produced. According to the invention the exchange of the press sectors can be effected rapidly, surely and easily.

The present invention consists in a vulcanizing mould for pneumatic tyres and the like comprising a plate and a counter-plate which, in use, are mounted on two mould carriers of a press, the facing surfaces of the two plates being provided with profiled discs which mould the profiles of the two side walls of a tyre carcass, a ring fixedly connected to said plate and having an annular inner surface of truncated cone shape, a plurality of radially adjustable sectors having outer surfaces which co-operate with the truncated cone-shaped annular surface of said ring, the inner surfaces of the sectors being provided with profiling for the moulding of the tread portion of the tyre carcass, guide elements for the axial guiding of the sectors on the plate and ring, said guide elements being provided with abutments for limiting the spacing of the sectors from one another, radial guide elements on the surfaces of the sectors and the counter-plate facing each other for effecting the simultaneous radial displacement of the sectors along the plane of the counter-plate when the plate is moved towards the counter-plate.

The vulcanizing mould basically comprises three parts, namely an upper plate A positioned above both mould carriers of the press, a counter-plate B on the lower mould carrier and a matrix C. The upper plate A is provided with a ring 10 having an annular chamber 12 through which flows a heating liquid, although the chamber 12 can contain some other source of heat. The inner surface 14 of the ring 10 is of truncated cone shape and diverges downwards.

Figure 1:
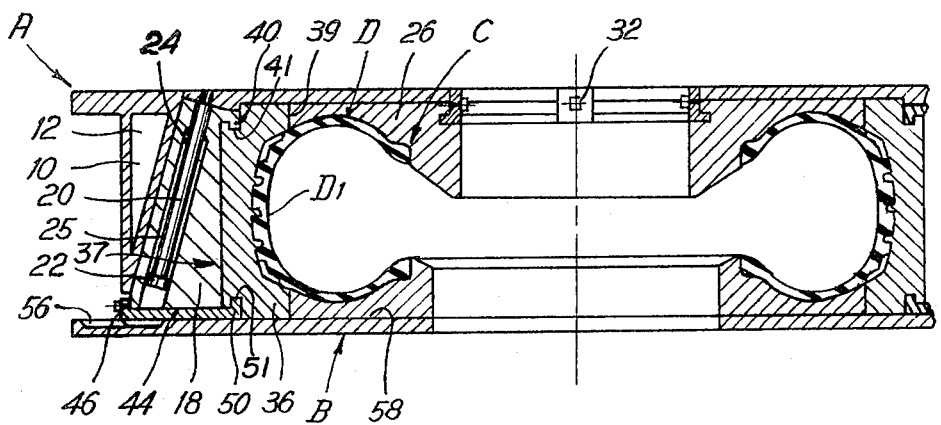
FIG. 1 is a cross-section through a closed tyre mould according to the present invention.
Figure 2:
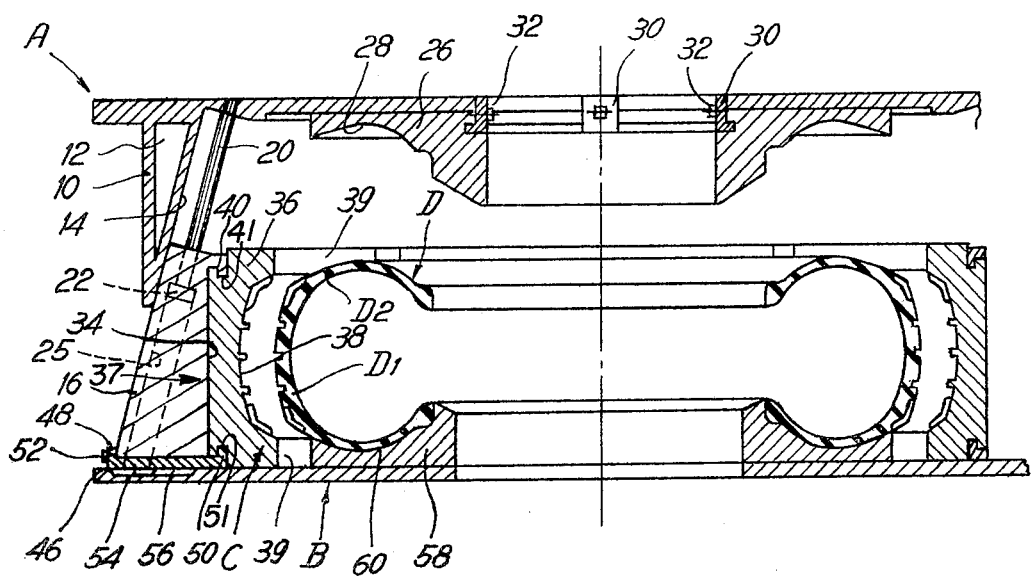
FIGS. 2 and 3 are cross-sections similar to FIG. 1 showing, respectively, the mould half-open and fully open.

Corresponding conical surfaces 16 of a plurality of sectors or segments 18 co-operate with the conical surface 14 and the sectors or segments are radially displaceable in a manner described below. Each of the sectors or segments 18 has guide elements for ensuring a synchronous radial displacement comprising at least two rods 20 which are fixed at their ends to the plate A and extend transversely of the sector or segment 18, the other ends of the rods 20 having heads 22 forming abutments. The rods 20 slide in bores 24 in the sectors or segments 18 and the heads 22 slide in bores 25 of larger diameter which are coaxial with the openings 24, the step between the bores 24 and 25 forming abutments for the heads 22. The axes of the rods 20 are inclined in such a manner that they extend parallel to the conical surfaces of the ring 10 and of the sectors or segments 18. When the plate A is raised (FIG. 3) the sectors or segments 18 slide downwardly on the rods 20 under their own weight until the heads 22 rest against the abutments formed by the bores 24, 25. when the plate A is lowered the sectors or segments 18 first rest on the counter-plate B and on further lowering of the plate A the sectors or segments 18 slide radially inwards on the counter-plate B (FIG. 1). A disc 26 is fixed to the lower surface of the plate A and the profiled annular region 28 of the disc moulds one side wall and shoulder D3, D2, respectively, of the tyre carcass D. The disc 26 is held on the plate A by angle-pieces 30 which themselves are fixed to the plate A by means of screws 32, whereby axial alignment of the disc 26 with the other parts of the mould is ensured.

Each of the sectors or segments 18 has an inner surface 34 to which is fixed a profiled insert 36 having a profiled surface 38 which moulds the tread portion D1 of the tyre carcass D. The profile inserts 36 are clamped to the sectors or segments 18 to define a second ring means 37 and in such a manner that the upper portion of each sector or segment 18 has a tooth 40 which engages in a corresponding groove 41 in the insert 36 and the lower portion of each sector or segment 18 has a recess 42 in which a curved plate 44 (see also FIG. 4) is received which has a vertical outer rim 46 which abuts the external surface of a cylindrical surface 48 of the sector or segment 18 at the lower end thereof. Similarly, the plate 44 has an inner rim 50 forming a tooth which engages in a corresponding lower groove 51 in the profiled insert 36. The outer rim 46 is provided with radial bores for screws 52 by means of which the plate 44 is secured to the sector 18. Each of the plates 44 has on its underside one or more blocks 54 each having a radially-extending longitudinal axis which engages in a corresponding radially extending guide groove 56 in the counter-plate B. The counter-plate B has a disc 58 fixed to its upper surface which is provided with an annular profiled region 60 which is similar to the region 28 of the disc 26 referred to above, and moulds the other side wall and shoulder D3, D2, respectively of the tyre carcass D.

The method of operation of the mould described above is as follows: the plates A and B are mounted, respectively, on the movable and fixed mould carriers of the press and the movable plate A is raised, the ring 10 is also lifted. The sectors 18 and associated inserts 36 initially rest on the counter-plate B until such time as the heads 22 of the guide pins 20 engage in the steps formed by the bores 24 and 25, when the sectors and inserts are lifted and removed from the counter-plate B. There is thus provided between the fixed plate B and the movable plate A a space (see FIG. 3) which provides free access to the plate B, so that an operator can position in this space the tyre carcass D that is to be vulcanized or that has been vulcanized. The tyre carcass is centered in the desired position by placing its lower wall D2, D3 in engagement with the upper surface 60 of the plate 58. After the tyre carcass D has been placed on the counter-plate B the operator lowers the upper plate A whereby the plates 44 engage the counter-plate B and the blocks 54 engage in the grooves 56. If the plate A is lowered still further, the inter-engagement of the surfaces 14, 16 effects a radial displacement of the sectors 18 and inserts 36, that is to say, the sectors, guided by the grooves 56 of the counter-plate B slide in a radial direction without axial displacement, until they reach their closed position. As a result the profiled surface 38 of the inserts 36 for moulding the tread D1 of the tyre carcass is located in precise radial engagement in the material thereof. During the closing movement of the mould, the disc 26 engages the side wall and shoulder D2, D3 of the tyre carcass, the edges 39 of the profiled surfaces 38 engaging in the edges of the discs 26, 58. As a result of this the profile of the tyre tread is moulded in a precise manner. Furthermore, the profile produced is not deformed in any way on the opening of the mould during the return movement of the sectors 18 and inserts 36, as the projecting parts of the profiled surface 38, as already stated, are pressed into, and withdrawn from the material of the tyre carcass by a radial movement.

After the completion of the vulcanizing process the plate A is raised in the usual manner to open the mould. When this takes place the disc 26 is removed from the tyre carcass D and at the same time the rods 20 effect a uniform radial outward movement of the sectors 18 and inserts 36 so that the profile of the inserts 36 is withdrawn from the tread D1 of the tyre carcass without deforming the latter or damaging it. As soon as the heads 22 of the guide rods 20 engage the step between the bores 24, 25, the sectors 18 and inserts 36 are raised and removed from the counter-plate B which enables the tyre carcass D to be removed without difficulty by the operator or by mechanical means. The profiled insert pieces 36 can easily be replaced by others which differ from one another in shape or in overall dimensions. In this connection it suffices merely to replace the inserts 36 by others, a process which can be carried out easily and quickly, as all that is required is to loosen the screws 52 and remove the plate 44. Thus, it is not necessary to dismantle the mould from the press. In this way the same mould can be used with different profiled inserts for different shapes and sizes of tyres.

Figures 3, 4, 5:
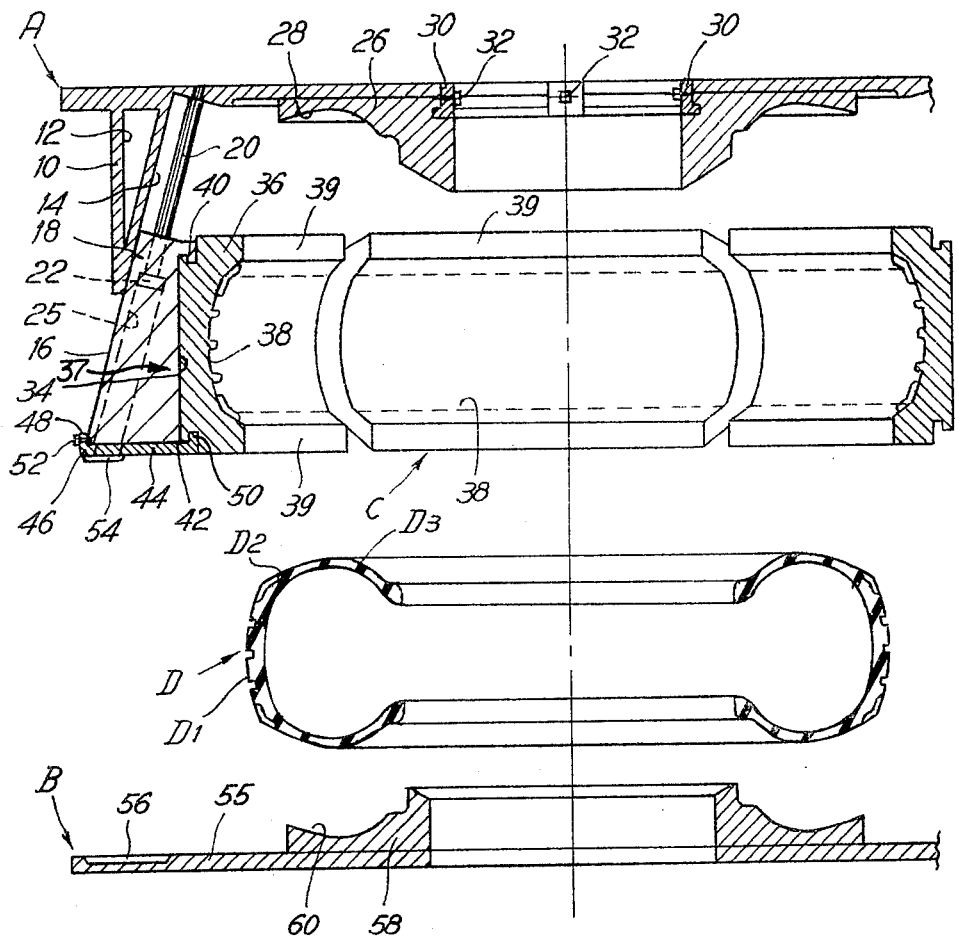
FIG. 4 is a perspective view of a detail of the mould.
FIG. 5 is a cross-section showing another form of the guide elements for the mould.

The mould described above can be subject to modifications to meet the requirements of the user. Thus to open the sectors 18 and inserts 36 the mould may be provided with spring means which act on the sectors. The spring means can be drawn on to the guide rods 20 in order to displace the sectors 18 and inserts 36 downwards. Alternatively, as shown in FIG. 5 the guide rods 20a at their free ends may be provided with a piston 64 which slides in a cylinder 66 which receives pressure fluid for the displacement of the sectors 18a and associated inserts in the desired direction. Furthermore, the disc 26 can be adjustable in axial direction by means of guides provided in the bottom plate A, in order to clamp the shoulders and side walls of the tyre carcass between the profile surfaces 28, 60, preferably before the sectors 18 and inserts 36 are moved towards the tyre carcass.

I claim:
1. A vulcanizing mould for pneumatic tires, comprising:
 a first plate positionable over one side of a tire to be vulcanized; a counter plate positionable over the opposite side of the tire and in opposed relationship to said first plate;
 said first plate carrying first ring means on the side thereof facing said counter plate; said first ring means having a generally truncated cone shaped surface that faces radially inwardly of the tire and that extends around the circumferential periphery of the tire when said first and counter plates are brought into engagement with the opposite sides of the tire;
 said counter plate engaging with a second ring means on the side thereof facing said first plate; said second ring means having a radially outwardly facing surface that engages and cooperates with said first ring surface, such that moving said first and said counter plates together shifts said second ring means radially inwardly;
 said second ring means being comprised of a plurality of segments, each of which is comprised of two separate elements; one of said segments elements being radially outward of the other radially inward element; all said outward elements having a respective outward surface and these element surfaces together defining said outwardly facing surface of said second ring means and all said outward elements also having clamping means for releasably clamping the respective said inward elements; each said inward element having clampable means that are securely but releasably clamped by said clamping means of said outward element, whereby said elements of each said segment are clamped together, and release of said clamping means permits easy removal of said inward element from outward element; said clamping means comprising a clamping plate that is removably secured to said outward element of each of said segments; each said clamping plate including a first projection extending from said clamping plate toward said inward element; said inward element clampable means comprising a first groove for receiving said first projection and said first projection extending into said first groove; said clamping plates being at one axial end of said second ring means;

at the opposite axial end of said second ring means, asid outward element clamping means further comprising a second projection from each said outward element extending toward said inward element; said clampable means further comprising a second cooperating groove in each said inward element to receive a said second projection and said second projection extending into said second groove, whereby said outward and inward elements are securely locked together by means of said first and second projections extending into the respective said grooves;

on the radially inward side of each said inward element is a profile for moulding the tread on the tire circumferential periphery;

radial movement guide means on said second ring means and on said counter plate and in cooperative engagement with each other for guiding the radial motion of said second ring means segments that is caused by their cooperative engagement with said first ring means conical surface;

cooperating guide elements connected with said second ring means for guiding motion of said second ring means relative to said first ring means and for retaining continuous engagement of said first ring means inward surface with said second ring means outward surface, thereby to cause radial shifting of said second ring means segments as said first and counter plates move.

2. A mould according to claim 1, wherein said guide elements for each of said segments comprise at least two rods, one end of each said rod is fixedly connected to said first plate, and a respective guide path for axial motion of each said guide rod being in said outward elements said guide rods being so arranged that their axes are parallel with said frustoconically shaped surface of said first ring means, and the other ends of said rods being provided with heads which are received in the respective said guide paths which are narrowed at a point along their length for limiting the relative axial movement between said first and clamping plates and the radial movement of said segments when said first plate and said counter plate are displaced from each other.

3. A mould according to claim 1, wherein said radial movement guide means comprises the facing surfaces of said segments and said counter plate having projections engaging radial grooves for guiding asid segments in the radial direction upon axial movement of said first plate toward said counter plate.

4. A mould according to claim 1, wherein said first ring means has a chamber that is outside the circumferential periphery of said second ring means when said first and said counter plates are together and in which said chamber is a heating means.

5. A mould according to claim 1, wherein each said clamping plate includes a clamping plate fastening projection that is wrapped over the circumferential periphery of said second ring means outward elements; fastening means for each said clamping plate fastening projection for holding it to said second ring means outward elements.

6. A mould according to claim 1, wherein said radial movement guide means is disposed between said clamping plates and said counter plate.

* * * * *